US012639249B2

(12) United States Patent
Redaelli

(10) Patent No.: US 12,639,249 B2
(45) Date of Patent: May 26, 2026

(54) MONOLITHIC NON-VOLATILE MEMORY DEVICE USING PERIPHERAL COMPONENT INTERCONNECT EXPRESS INTERFACE FOR EMBEDDED SYSTEM

(71) Applicant: Micron Technology, Inc., Boise, ID (US)

(72) Inventor: Marco Redaelli, Munich (DE)

(73) Assignee: Micron Technology, Inc., Boise, ID (US)

( * ) Notice: Subject to any disclaimer, the term of this patent is extended or adjusted under 35 U.S.C. 154(b) by 144 days.

(21) Appl. No.: 18/621,350

(22) Filed: Mar. 29, 2024

(65) Prior Publication Data

US 2024/0338334 A1 Oct. 10, 2024

Related U.S. Application Data

(60) Provisional application No. 63/494,583, filed on Apr. 6, 2023.

(51) Int. Cl.
*G06F 13/42* (2006.01)
*G06F 9/4401* (2018.01)
*G06F 13/40* (2006.01)

(52) U.S. Cl.
CPC ........ *G06F 13/4221* (2013.01); *G06F 9/4406* (2013.01); *G06F 13/4063* (2013.01)

(58) Field of Classification Search
CPC ............. G06F 13/4063; G06F 13/4221; G06F 13/4282; G06F 9/4406
See application file for complete search history.

(56) References Cited

U.S. PATENT DOCUMENTS

2007/0067679 A1* 3/2007 Deobald ............... G06F 9/4406
714/36
2014/0325496 A1* 10/2014 Son ........................... G06F 8/65
717/168
2016/0248591 A1* 8/2016 Choi ...................... H04L 9/3242
2018/0181520 A1* 6/2018 Osqueizadeh ...... G06F 13/4022
2021/0208900 A1* 7/2021 Pamoti ................ G06F 11/1417
2022/0398152 A1* 12/2022 Cho ......................... G06F 21/64

* cited by examiner

*Primary Examiner* — Phong H Dang
(74) *Attorney, Agent, or Firm* — Harrity & Harrity, LLP

(57) ABSTRACT

An embedded system includes a host device that includes a first peripheral component interconnect express (PCIe) interface; a non-volatile memory (NVM) device that includes a second PCIe interface; and a PCIe bus directly coupled to the first PCIe interface and the second PCIe interface for transmitting direct communications between the host device and the monolithic NVM device.

20 Claims, 4 Drawing Sheets

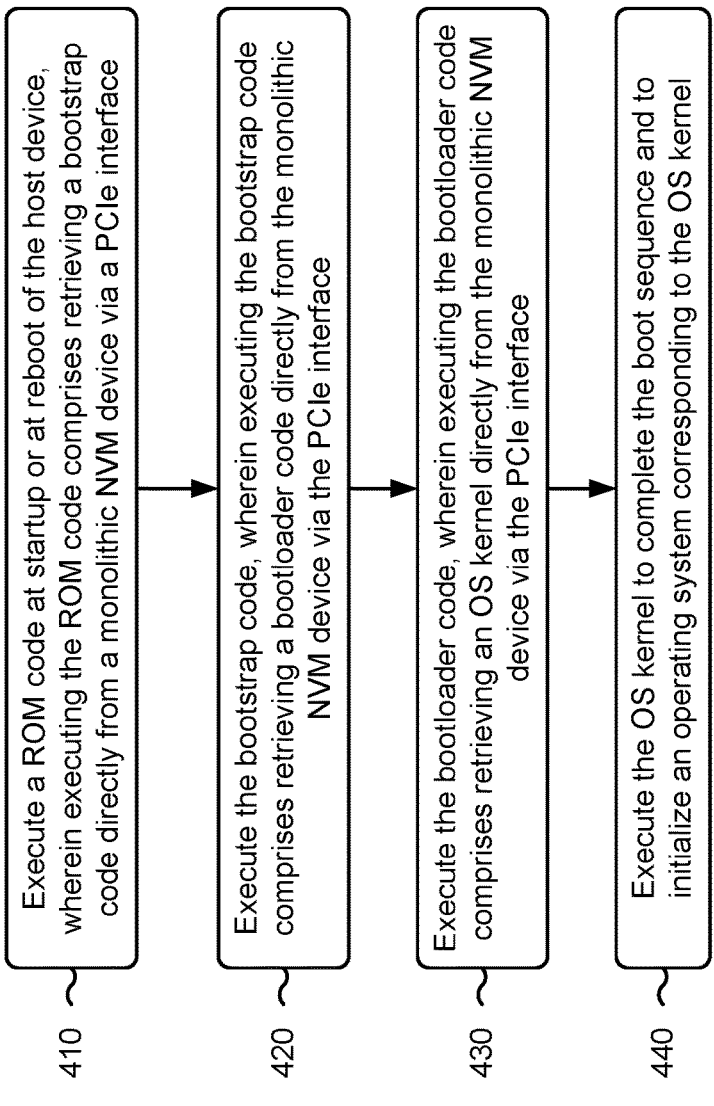

410   Execute a ROM code at startup or at reboot of the host device, wherein executing the ROM code comprises retrieving a bootstrap code directly from a monolithic NVM device via a PCIe interface 420   Execute the bootstrap code, wherein executing the bootstrap code comprises retrieving a bootloader code directly from the monolithic NVM device via the PCIe interface 430   Execute the bootloader code, wherein executing the bootloader code comprises retrieving an OS kernel directly from the monolithic NVM device via the PCIe interface 440   Execute the OS kernel to complete the boot sequence and to initialize an operating system corresponding to the OS kernel

MONOLITHIC NON-VOLATILE MEMORY DEVICE USING PERIPHERAL COMPONENT INTERCONNECT EXPRESS INTERFACE FOR EMBEDDED SYSTEM

CROSS REFERENCE TO RELATED APPLICATION

This Patent application claims priority to U.S. Provisional Patent Application No. 63/494,583, filed on Apr. 6, 2023, and entitled "MONOLITHIC NON-VOLATILE MEMORY DEVICE USING PERIPHERAL COMPONENT INTER-CONNECT EXPRESS INTERFACE FOR EMBEDDED SYSTEM." The disclosure of the prior Application is considered part of and is incorporated by reference into this Patent Application.

TECHNICAL FIELD

The present disclosure generally relates to memory devices, memory device operations, and, for example, to a monolithic non-volatile monolithic memory (NVM) device using peripheral component interconnect express (PCIe) for an embedded system.

BACKGROUND

A non-volatile memory device, such as a NAND memory device, may use circuitry to enable electrically program-ming, erasing, and storing of data even when a power source is not supplied. Non-volatile memory devices may be used in various types of electronic devices, such as computers, mobile phones, or automobile computing systems, among other examples.

A non-volatile memory device may include an array of memory cells, a page buffer, and a column decoder. In addition, the non-volatile memory device may include a control logic unit (e.g., a controller), a row decoder, or an address buffer, among other examples. The memory cell array may include memory cell strings connected to bit lines, which are extended in a column direction.

A memory cell, which may be referred to as a "cell" or a "data cell," of a non-volatile memory device may include a current path formed between a source and a drain on a semiconductor substrate. The memory cell may further include a floating gate and a control gate formed between insulating layers on the semiconductor substrate. A program-ming operation (sometimes called a write operation) of the memory cell is generally accomplished by grounding the source and the drain areas of the memory cell and the semiconductor substrate of a bulk area, and applying a high positive voltage, which may be referred to as a "program voltage," a "programming power voltage," or "VPP," to a control gate to generate Fowler-Nordheim tunneling (re-ferred to as "F-N tunneling") between a floating gate and the semiconductor substrate. When F-N tunneling is occurring, electrons of the bulk area are accumulated on the floating gate by an electric field of VPP applied to the control gate to increase a threshold voltage of the memory cell.

An erasing operation of the memory cell is concurrently performed in units of sectors sharing the bulk area (referred to as "blocks"), by applying a high negative voltage, which may be referred to as an "erase voltage" or "Vera," to the control gate and a configured voltage to the bulk area to generate the F-N tunneling. In this case, electrons accumu-lated on the floating gate are discharged into the source area, so that the memory cells have an erasing threshold voltage distribution.

Each memory cell string may have a plurality of floating gate type memory cells serially connected to each other. Access lines (sometimes called "word lines") are extended in a row direction, and a control gate of each memory cell is connected to a corresponding access line. A non-volatile memory device may include a plurality of page buffers connected between the bit lines and the column decoder. The column decoder is connected between the page buffer and data lines.

BRIEF DESCRIPTION OF THE DRAWINGS

FIG. 4 is a flowchart of an example method associated with a monolithic non-volatile memory using a PCIe inter-face for an embedded system.

DETAILED DESCRIPTION

Figure 1:
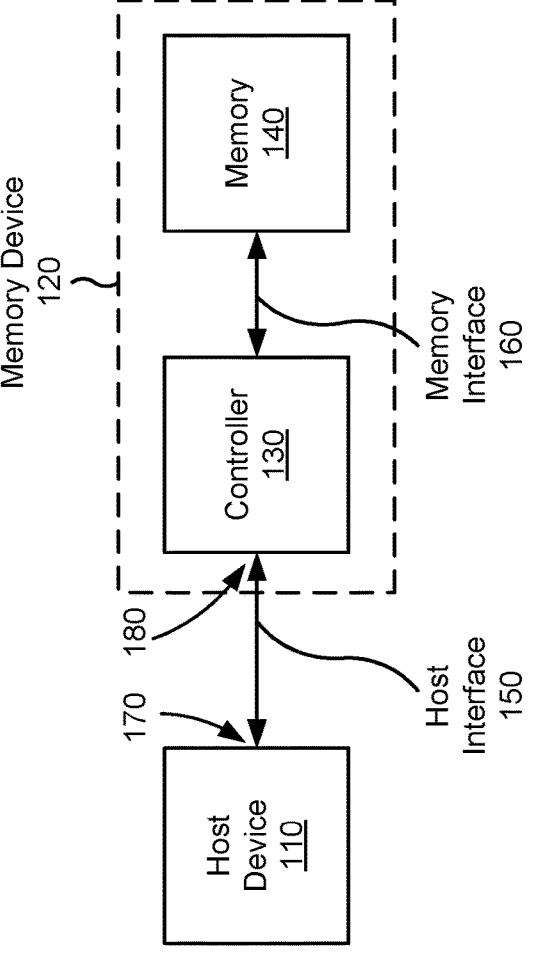
FIG. 1 is a diagram illustrating an example embedded system according to one or more implementations.

Systems may include a separate controller (e.g., a multi-channel solid-state device (SSD) controller) that interfaces between a host device and a memory bus that is coupled to a plurality of memory chips (e.g., up to 32 memory dies). For example, the separate controller may be coupled to the host device by a first external bus and coupled to the plurality of memory chips by a second external bus (e.g., the memory bus). The separate controller may be used by the host device as an intermediary device to access the plurality of memory chips coupled to the memory bus. This configu-ration requires a double translation of commands sent from the host device to the memory chips. A first translation of the commands is performed by the separate controller, and a second translation of the commands is performed by the control circuitry of the memory chips. Each translation consumes processing bandwidth and slows the transmission time between the two end points (e.g., between the host device and a memory chip).

In single memory chip configurations, the host device may be coupled to a single memory chip through the separate controller. However, more and more single memory chip configurations are requiring more bandwidth, and the separate controller represents a bottleneck in throughput, which limits the bandwidth of the system.

Moreover, the separate controller can be expensive. Thus, the separate controller adds substantial cost to the system. The cost of the separate controller may be cost prohibitive for systems that utilize memory in lower memory capacities (e.g., 64 GB, 128 GB, and 256 GB). For example, some systems only require a single memory chip. Thus, using the separate controller between the host device and the single memory chip may be impractical from a cost perspective. In other words, for systems that utilize the lower memory capacities (e.g., a single memory chip), the separate con-troller is too expensive compared to the amount of data stored in the single memory chip. In essence, the separate controller is overkill for single memory chip configurations.

Some implementations provide an embedded system that includes a host device comprising a first PCIe interface, a monolithic NVM device comprising a second PCIe interface, and a PCIe bus directly coupled to the first PCIe interface and the second PCIe interface for transmitting direct communications between the host device and the monolithic NVM device. Thus, there are no intervening devices between the monolithic NVM device and the host device (e.g., between the first PCIe interface and the second PCIe interface). The monolithic NVM device may be a single memory chip (e.g., a monolithic integrated circuit) with non-volatile memory that is accessed by the host device via direct communications on the PCIe bus. Thus, a separate controller between a host device and memory is eliminated. As a result, system cost can be reduced and bandwidth (e.g., data throughput) can be increased. For example, only a single translation of commands may be needed for the host device to retrieve (e.g., read) data from the monolithic NVM device. The single translation of commands may provide more data throughput compared to a system that requires two or more translations of commands to access data from memory.

In some implementations, the monolithic NVM device may have a single PCIe port (i.e., only one PCIe port) that is connected to the host device via the PCIe bus. Thus, the PCIe bus may be a single PCIe bus connection that include a single channel (i.e., only one channel) that enables bi-directional communication between the host device and the monolithic NVM device. Utilizing a single channel may increase data throughput. Moreover, the simplicity of using a single channel may reduce system cost.

In some implementations, the host device may use the non-volatile memory of the monolithic NVM device to perform a boot sequence. The direct connection between the host device and the monolithic NVM device via the PCIe bus can provide faster boot times than would otherwise be possible if the separate controller between the host device and the NVM was provided. For example, the non-volatile memory of the monolithic NVM device may be configured with a boot region that stores a bootstrap code, a bootloader code, and an operating system (OS) kernel. The host device may sequentially retrieve the bootstrap code, the bootloader code, and the OS kernel directly from the monolithic NVM device via the PCIe bus to execute the boot sequence in order to initialize an operating system of the host device. For example, the monolithic NVM device may sequentially transmit the bootstrap code, the bootloader code, and the OS kernel to the host device in response to receiving one or more commands directly from the host device via the PCIe bus. In some implementations, the bootstrap code, the boot-loader code, and the OS kernel are stored in adjacent PCIe address spaces of the boot region of the monolithic NVM device, which may enable even faster boot times to be realized.

FIG. 1 is a diagram illustrating an example embedded system 100 according to one or more implementations. The embedded system 100 is a computer system that includes a host device 110 and a monolithic memory device 120 implemented as a peripheral device (e.g., computer memory) to the host device 110. The embedded system 100 may have a dedicated function within a larger mechanical or electronic system, such as an automotive system. Thus, the embedded system 100 may include one or more devices, apparatuses, and/or components for performing operations described herein. The monolithic memory device 120 may include a controller 130 (e.g., a memory controller) and memory 140. The host device 110 may communicate with the monolithic memory device 120 (e.g., the controller 130 of the monolithic memory device 120) via a host interface 150. For example, the host interface 150 may be a PCIe interface or a PCIe bus that couples the host device 110 directly to the monolithic memory device 120. The host device 150 may be a single PCIe bus connection. For example, the host interface 150 may include two PCIe interfaces that form the PCIe bus (e.g., the single PCIe bus connection) when electrically coupled together. The control-ler 130 and the memory 140 may communicate via a memory interface 160.

The embedded system 100 may be any electronic device configured to store data in memory. For example, the embed-ded system 100 may be a computer, a mobile phone, a wired or wireless communication device, a network device, a server, a device in a data center, a device in a cloud computing environment, a vehicle (e.g., an automobile or an airplane), and/or an Internet of Things (IoT) device. The host device 110 may include one or more processors configured to execute instructions and store data in the memory 140. For example, the host device 110 may include a central processing unit (CPU), a graphics processing unit (GPU), a field-programmable gate array (FPGA), an application-spe-cific integrated circuit (ASIC), and/or another type of pro-cessing component.

In some implementations, the host device 110 has a PCIe interface 170 (e.g., a PCIe port, sometimes referred to as a PCIe slot) that is configured to couple directly to the host interface 150 (e.g., the PCIe bus). In some implementations, two PCIe interfaces form the host interface 150 (e.g., the PCIe bus) when the two PCIe interfaces are coupled together. Accordingly, the host device 110 may be referred to as a PCIe host device. In some implementations, the host interface 150 (e.g., the PCIe bus) is a single bidirectional channel for bidirectional communications between the host device 110 and the monolithic memory device 120. In other words, the PCIe bus may comprise only one bidirectional channel.

In some implementations, the host device 110 may be a system-on-chip (SoC) that includes one or more CPUs, read-only memory (ROM), random-access memory (RAM), such as dynamic RAM (DRAM) and/or static RAM (SRAM), and the PCIe interface 170 (e.g., the PCIe port). A system-on-chip is an integrated circuit or an IC that takes a single platform and integrates an entire electronic or com-puter system onto a single chip. Thus, the host device 110 may incorporate one or more CPUs, input and output ports, internal memory, and other components in a single IC or chip.

The ROM of the host device 110 may be configured to store a ROM code. At startup or reboot of the host device 110, the host device 110, via a CPU, may be configured to execute the ROM code, which causes the host device 110 to initiate and execute a boot sequence. The RAM of the host device 110 may be used to store a bootstrap code, a bootloader code, and an OS kernel that are retrieved from the memory 140 of the monolithic memory device 120 during the boot sequence. The host device 110, via a CPU, may be configured to execute the bootstrap code, the boot-loader code, and the OS kernel according to the boot sequence in order to initialize an operating system of the host device 110.

The monolithic memory device 120 may be an electronic device or apparatus configured to store data in non-volatile memory. For example, in some implementations, the mono-lithic memory device 120 may be an electronic device configured to store data persistently in non-volatile memory. For example, the non-volatile memory may be configured to maintain stored data after the monolithic memory device 120 is powered off. The non-volatile memory may store persistent firmware or other instructions or code for execution by the controller 130 or for execution by the host device 110. For example, the monolithic memory device 120 may be a NAND memory device (e.g., a NAND flash memory device). The monolithic memory device 120 may be a PCIe NAND memory device that has a PCIe interface 180 (e.g., a PCIe port) that is configured to couple directly to the host interface 150 (e.g., the PCIe bus). In this case, the memory 140 may include non-volatile memory configured to maintain stored data after the monolithic memory device 120 is powered off. For example, the memory 140 may include NAND memory. When the PCIe interface 170 and the PCIe interface 180 are coupled together (e.g., directly coupled together), the PCIe interface 170 and the PCIe interface 180 may form the PCIe bus (e.g., the single PCIe bus connection). In other words, the PCIe interface 170 and the PCIe interface 180 may be physically (e.g., mechanically) and electrically coupled together to form the host interface 150.

In some implementations, the monolithic memory device 120 may be a monolithic NVM device that includes the controller 130, the memory 140 that includes a plurality of memory cells, and the PCIe interface 180 (e.g., a PCIe port) monolithically integrated in a single package (e.g., a package assembly or a memory chip package). In some implementations, the controller 130, the memory 140, and the PCIe interface 180 (e.g., a PCIe port) are integrated on a single die (e.g., a NAND die). Thus, the monolithic memory device 120 may be or may include a monolithic integrated circuit (IC) that includes the controller 130, the memory 140, and the PCIe interface 180 (e.g., a PCIe port). A monolithic IC is a complete circuit or group of circuits manufactured in a single piece of semiconductor material, such as silicon. Thus, the monolithic memory device 120 may be a NAND memory chip that includes a single die that comprises the controller 130, the memory 140, and the PCIe interface 180 (e.g., a PCIe port). In some implementations, the controller 130 includes the PCIe interface 180 (e.g., a PCIe port) or is coupled to the PCIe interface 180 (e.g., PCIe port) of the monolithic memory device 120 and is configured to be directly coupled to the host interface 150 (e.g., the PCIe bus). For example, the controller 130 may be configured to manage data stored in the memory 140, read data from the memory 140 for providing the data to the host device 110, and communicate with the host device 110, including receiving and processing commands from the host device 110 and transmitting data to the host device 110.

In some implementations, the memory 140 or the monolithic memory device 120 may include volatile memory that requires power to maintain stored data and that loses stored data after the monolithic memory device 120 is powered off, such as one or more latches and/or RAM, such as DRAM and/or SRAM. For example, the volatile memory may cache data read from or to be written to non-volatile memory, and/or may cache instructions to be executed by the controller 130.

The controller 130 may be any device or circuit configured to communicate with the host device 110 (e.g., via the host interface 150) and the memory 140 (e.g., via the memory interface 160). Additionally, or alternatively, the controller 130 may be configured to control operations of the monolithic memory device 120 and/or the memory 140. For example, the controller 130 may include control logic, a memory controller, a system controller, an ASIC, an FPGA, a processor, a microcontroller, and/or one or more processing components. In some implementations, the controller 130 may be a controller that may communicate directly with the host device 110 and perform memory operations to be performed in connection with the memory 140, for example, by communicating directly with the memory 140. In some implementations, the controller 130 may be a low-level controller, which may receive instructions regarding memory operations from the host device 110. As an example, a low-level controller may be a non-volatile memory controller (e.g., a NAND controller) and/or a volatile memory controller (e.g., a DRAM controller). In some implementations, a set of operations described herein as being performed by the controller 130 may be performed by a single controller (e.g., the entire set of operations may be performed by a single high-level controller or a single low-level controller). Alternatively, a set of operations described herein as being performed by the controller 130 may be performed by more than one controller (e.g., a first subset of the operations may be performed by a high-level controller and a second subset of the operations may be performed by a low-level controller).

The host interface 150 enables communication between the host device 110 and the monolithic memory device 120. For example, the host interface 150 may be a PCIe bus that enables direct communication between the host device 110 and the monolithic memory device 120. The host device 110 may be configured to transmit NAND physical interface commands directly to the monolithic memory device 120 via the PCIe bus. Open NAND Flash Interface (ONFI) commands (e.g., ONFI commands or ONFI protocol cmds) are one type of raw NAND physical interface commands that may be transmitted from the host device 110 to the monolithic memory device 120 to instruct the monolithic memory device 120 to perform an operation (e.g., a read operation). Thus, the host device 110 may be configured to transmit ONFI commands, another type of raw NAND physical interface commands, or any future evolution of raw NAND physical interface commands directly to the monolithic memory device 120 via the PCIe bus.

Having a direct PCIe interface between the host device 110 and the monolithic memory device 120 provides an opportunity to eliminate a separate controller (e.g., a multichannel solid-state device (SSD) controller) that may typically be arranged between the host device 110 and the monolithic memory device 120 (e.g., between the host device and the memory 140). As a result, the embedded system 100 does not include the separate controller, which provides cost savings. In addition, the direct PCIe interface between the host device 110 and the monolithic memory device 120 simplifies an interaction between the host device 110 and the monolithic memory device 120. For example, two or more translations of ONFI commands are typically needed when a separate controller is provided between the host device 110 and the monolithic memory device 120. For example, the ONFI commands may first be received by the separate controller, where the ONFI commands are translated before being transmitted to the monolithic memory device 120, which translates the ONFI commands again at the controller 130. This double translation consumes more processing bandwidth, slows the communications between the host device 110 and the monolithic memory device 120, and results in slower boot times for the host device 110. The direct PCIe interface between the host device 110 and the monolithic memory device 120 reduces the number of translations to one, which is performed by the controller 130. Thus, the translation performed by the separate controller can be eliminated, resulting in higher communication speeds between the host device 110 and the monolithic memory device 120 and faster boot times for the host device 110.

The memory interface 160 enables communication between the monolithic memory device 120 and the memory 140. The memory interface 160 may include a non-volatile memory interface (e.g., for communicating with non-volatile memory), such as a NAND interface. Additionally, or alternatively, the memory interface 160 may include a volatile memory interface (e.g., for communicating with volatile memory), such as a double data rate (DDR) interface.

In some implementations, one or more systems, devices, apparatuses, components, and/or controllers of FIG. 1 may include a host device comprising a first PCIe interface (e.g., a first PCIe port); a monolithic NVM device comprising a second PCIe interface (e.g., a second PCIe port); and a PCIe bus directly coupled to the first PCIe interface and the second PCIe interface for transmitting direct communications between the host device and the monolithic NVM device.

In some implementations, one or more systems, devices, apparatuses, components, and/or controllers of FIG. 1 may be directed to a monolithic NVM device that includes a memory configured with a boot region, wherein the boot region is configured to store a bootstrap code in a first PCIe address space of the boot region, a bootloader code in a second PCIe address space of the boot region, and an OS kernel in a third PCIe address space of the boot region, wherein the first PCIe address space, the second PCIe address space, and the third PCIe address space are adjacent PCIe address spaces; a PCIe interface (e.g., a PCIe bus); and a controller configured to communicate directly with a host device via the PCIe interface, wherein the controller is configured to sequentially transmit the bootstrap code, followed by the bootloader code, and further followed by the OS kernel to the host device during a boot sequence of the host device.

In some implementations, one or more systems, devices, apparatuses, components, and/or controllers of FIG. 1 may be configured to execute a ROM code at startup or at reboot of the host device, wherein executing the ROM code comprises retrieving a bootstrap code directly from a monolithic NVM device via a PCIe interface (e.g., a PCIe bus); executing the bootstrap code, wherein executing the bootstrap code comprises retrieving a bootloader code directly from the monolithic NVM device via the PCIe interface; executing the bootloader code, wherein executing the bootloader code comprises retrieving an OS kernel directly from the monolithic NVM device via the PCIe interface; and executing the OS kernel to complete the boot sequence and to initialize an operating system corresponding to the OS kernel.

As indicated above, FIG. 1 is provided as an example. Other examples may differ from what is described with regard to FIG. 1.

Figure 2:
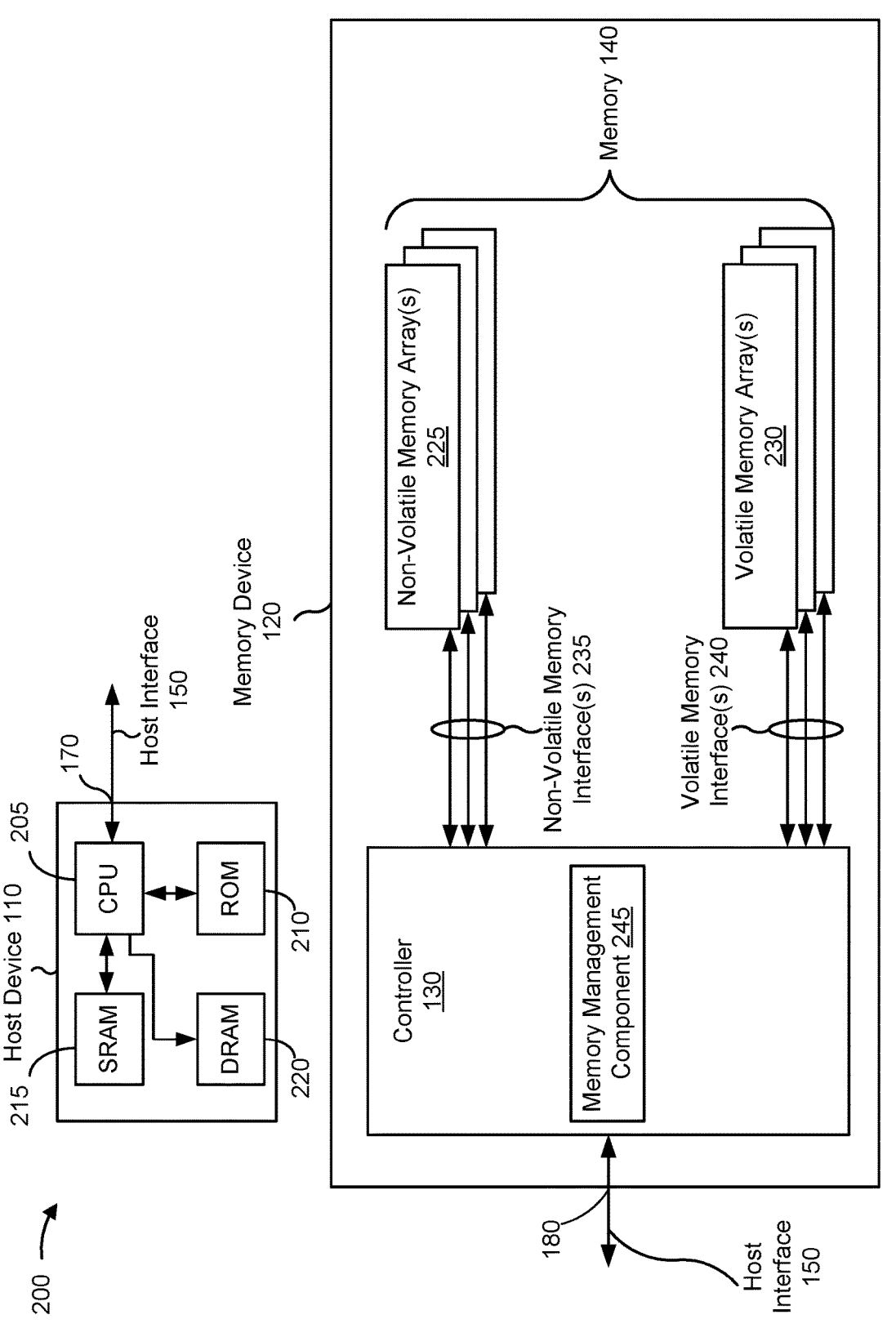
FIG. 2 is a diagram of example embedded system accord-ing to one or more implementations.

FIG. 2 is a diagram of example embedded system 200 according to one or more implementations. The embedded system 200 may be similar to the embedded system 100 described in connection with FIG. 1, with additional detail shown, including components included in a host device 110 and components included in a monolithic memory device 120. As described above in connection with FIG. 1, the host device 110 may include a PCIe interface 170 coupled to a host interface 150 (e.g., a PCIe bus), a CPU 205 coupled to the PCIe interface 170, a ROM 210 configured to store a ROM code to be executed by the CPU 205, an SRAM 215 configured to store a bootstrap code retrieved from NVM of the monolithic memory device 120 and to be executed by the CPU 205, and a DRAM 220 configured to store a bootloader code and an OS kernel retrieved from the NVM of the monolithic memory device 120 and to be executed by the CPU 205.

In some implementations, the host device 110 may include a different type of on-board processor instead of a CPU or in addition to a CPU (e.g., a GPU, an FPGA, an ASIC, and/or another type of processing component). Thus, one or more operations described herein as being performed by the CPU 205 may be performed by a different processing component.

The monolithic memory device 120 may include a controller 130, memory 140, and a PCIe interface 180 coupled to the host interface 150 (e.g., the PCIe bus). Thus, the host device 110 and the monolithic memory device 120 may be directly coupled via the host interface 150 for direct communications. As shown in FIG. 2, the memory 140 may include one or more non-volatile memory arrays 225, such as one or more NAND memory arrays. Additionally, the memory 140 may include one or more volatile memory arrays 230, such as one or more SRAM arrays and/or one or more DRAM arrays. The controller 130 may transmit signals to and receive signals from a non-volatile memory array 225 using a non-volatile memory interface 235. The controller 130 may transmit signals to and receive signals from a volatile memory array 230 using a volatile memory interface 240.

The controller 130 may control operations of the memory 140, such as by executing one or more instructions. For example, the monolithic memory device 120 may store one or more instructions in the memory 140 as firmware, and the controller 130 may execute those one or more instructions. Additionally, or alternatively, the controller 130 may receive one or more instructions from the host device 110 via the host interface 150, and may execute those one or more instructions. In some implementations, a non-transitory computer-readable medium (e.g., volatile memory and/or non-volatile memory) may store a set of instructions (e.g., one or more instructions or code) for execution by the controller 130. The controller 130 may execute the set of instructions to perform one or more operations or methods described herein. In some implementations, execution of the set of instructions, by the controller 130, causes the controller 130 and/or the monolithic memory device 120 to perform one or more operations or methods described herein. In some implementations, hardwired circuitry is used instead of or in combination with the one or more instructions to perform one or more operations or methods described herein. Additionally, or alternatively, the controller 130 and/or one or more components of the monolithic memory device 120 may be configured to perform one or more operations or methods described herein. An instruction is sometimes called a "command."

For example, the controller 130 may transmit signals to and/or receive signals from the memory 140 based on the one or more instructions, such as to transfer data to (e.g., write or program), to transfer data from (e.g., read), and/or to erase all or a portion of the memory 140 (e.g., one or more memory cells, pages, sub-blocks, blocks, or planes of the memory 140). Additionally, or alternatively, the controller 130 may be configured to control access to the memory 140 and/or to provide a translation layer between the host device 110 and the memory 140 (e.g., for mapping logical addresses to physical addresses of a memory array). In some implementations, the controller 130 may translate a host interface command (e.g., a command received from the host device 110) into a memory interface command (e.g., a command for performing an operation on a memory array).

As shown in FIG. 2, the controller 130 may include a memory management component 245. In some implementations, the memory management component 245 may be implemented as one or more instructions (e.g., firmware) executed by the controller 130. Alternatively, the memory management component 245 may be implemented as an integrated circuit or part of an integrated circuit (e.g., part of a monolithic IC that is integrated with the memory 140).

The memory management component 245 may be configured to manage performance of the monolithic memory device 120. For example, the memory management component 245 may perform wear leveling, bad block management, block retirement, read disturb management, and/or other memory management operations. In some implementations, the monolithic memory device 120 may store (e.g., in memory 140) one or more memory management tables. A memory management table may store information that may be used by or updated by the memory management component 245, such as information regarding memory block age, memory block erase count, and/or error information associated with a memory partition (e.g., a memory cell, a row of memory, a block of memory, or the like).

The memory management component 245 may be configured to partition the memory 140 into two or more partitions or memory regions. For example, the memory management component 245 may configure the memory 140 with a boot region or a boot partition used during a boot sequence of the embedded system 200 (e.g., during a boot sequence of the host device 110). In some implementations, the NVM of the memory 140, comprising the one or more non-volatile memory arrays 225, may be configured with the boot region, may be configured as the boot region, or may be used as the boot region for storing the bootstrap code, the bootloader code, and/or the OS kernel. For example, the boot region may be configured with a plurality of adjacent PCIe NAND address spaces, and the bootstrap code, the bootloader code, and/or the OS kernel may be stored in the plurality of adjacent PCIe NAND address spaces.

A PCIe address space may be an address space in the memory 140 that is used by PCIe devices. PCIe NAND address space may be a PCIe address space implemented in NAND memory. For example, a PCIe address space may be a range of memory addresses used by the host device 110 connected to the monolithic memory device 120 using the host interface 150 (e.g., the PCIe bus). Each PCIe address space may be accessed according to a memory-mapping such that the host device 110 (e.g., the CPU 205) can read and/or write to a PCIe address space as if the memory addresses of the PCIe address space were regular memory locations. Therefore, a PCIe address space may be accessible (e.g., directly accessible) to the host device 110 via the host interface 150.

In some implementations, the bootstrap code may be stored in a first PCIe NAND address space, the bootloader code may be stored in a second PCIe NAND address space that is adjacent to the first PCIe NAND address space, and the OS kernel may be stored in a third PCIe NAND address space that is adjacent to the second PCIe NAND address space. Thus, the second PCIe NAND address space may be arranged adjacent to the first PCIe NAND address space and the third PCIe NAND address space such that the second PCIe NAND address space is arranged between the first PCIe NAND address space and the third PCIe NAND address space. As a result, the bootstrap code, the bootloader code, and the OS kernel may be accessed (e.g., read from) sequentially from a respective PCIe NAND address space during the boot sequence.

The memory management component 245 may also manage a data flow in and out of memory 140. For example, the memory management component 245 may retrieve data (e.g., the bootstrap code, the bootloader code, and/or the OS kernel) based on one or more commands received from the host device 110, and transmit the data to the host device 110 via the host interface 150.

The host device 110 may be configured to sequentially retrieve the bootstrap code, the bootloader code, and the OS kernel directly from the monolithic memory device 120 via the host interface 150 to execute the boot sequence in order to initialize an operating system of the host device 110. For example, the CPU 205 may be configured to sequentially retrieve the bootstrap code, the bootloader code, and the OS kernel directly from the monolithic memory device 120 via the host interface 150 to execute the boot sequence. For example, at startup or reboot of the host device 110, the host device 110 may be configured to execute a ROM code stored in the ROM 210, which causes the host device 110 (e.g., the CPU 205) to send a first read command to the monolithic memory device 120 to retrieve the bootstrap code from the memory 140.

During an execution of the ROM code, the CPU 205 may be configured to detect one or more hardware parameters, including an interface speed of the PCIe bus, a number of lanes of the PCIe bus, and a memory location of the boot region in the monolithic memory device 120, including a memory location or a range of memory addresses of each PCIe address space. For example, during the execution of the ROM code, the CPU 205 may use a configuration input signal to detect the one or more hardware parameters. An error correction code (ECC) engine and boot partition of the monolithic memory device 120 may preload a user configuration that can be detected by the host device 110.

The ROM code may be configured to configure the host device 110 (e.g., the CPU 205) according to the one or more hardware parameters for retrieving the bootstrap code, the bootloader code, and the OS kernel directly from the monolithic memory device 120. As a result, the host device 110 may be configurable for different system configurations and memory configurations that may have different hardware parameters in order to communicate with and retrieve data from the monolithic memory device 120. For example, the configuration of the host device 110 may vary or be adapted for different SoCs and/or different embedded systems. Thus, the execution of the ROM code is used to configure hardware settings of the host device 110 according to the one or more detected hardware parameters such that the host device 110 is configured for retrieving the bootstrap code, the bootloader code, and the OS kernel directly from the monolithic memory device 120 using the PCIe bus.

Furthermore, the configured hardware settings of the host device 110 and the use of the plurality of adjacent PCIe NAND address spaces for storing the bootstrap code, the bootloader code, and the OS kernel may enable the host device 110 (e.g., the CPU 205) to perform a faster boot operation over the PCIe bus than may otherwise be possible.

Based on receiving the first read command, the monolithic memory device 120 may be configured to transmit, during the boot sequence of the embedded system 200, the bootstrap code directly to the host device 110 via the PCIe bus. The host device 120 may be configured to store, during the boot sequence of the embedded system 200, the bootstrap code in the SRAM 215 and execute, during the boot sequence of the embedded system 200, the bootstrap code stored in the SRAM 215.

During an execution of the bootstrap code, the host device 110 may be configured to copy the bootloader code from the monolithic memory device 120 to the DRAM 220 of the host device 110 and configure hardware settings of the host device 110. For example, during the execution of the bootstrap code, the host device 110 may be configured to transmit a second read command directly to the monolithic memory device 120 via the PCIe bus. In response to the second read command, the monolithic memory device 120 may be configured to transmit the bootloader code directly to the host device 110 via the PCIe bus, and the host device 110 may be configured to execute the bootloader code stored in the DRAM 220.

During an execution of the bootloader code, the host device 110 may be configured to copy the OS kernel from the monolithic memory device 120 to the DRAM 220 of the host device 110. For example, during the execution of the bootloader code, the host device 110 may be configured to transmit a third read command directly to the monolithic memory device 120 via the PCIe bus. In response to the third read command, the monolithic memory device 120 may be configured to transmit the OS kernel directly to the host device 110 via the PCIe bus, and the host device 110 may be configured to execute the OS kernel stored in the DRAM 220.

During an execution of the OS kernel, the host device 110 may be configured to complete the boot sequence and initialize the operating system of the host device 110 that corresponds to the OS kernel. In other words, the operating system is launched by the CPU 205 to complete the boot sequence and the operating system takes control of the embedded system 100.

Thus, the controller 130 of the monolithic memory device 120 may be configured to sequentially transmit the bootstrap code, the bootloader code, and the OS kernel to the host device 110 in response to receiving one or more commands via the PCIe interface. The controller 130 may sequentially read the bootstrap code, the bootloader code, and the OS kernel from the plurality adjacent PCIe NAND address spaces based on the memory-mapping. For example, based on receiving the first read command, the second read command, and the third read command, the controller 130 of the monolithic memory device 120 may communicate directly with a host device 110 via the PCIe bus in order to transmit the bootstrap code, followed by the bootloader code, and further followed by the OS kernel to the host device 110 during the boot sequence of the host device 110. The CPU 205 of the host device may be configured to send the one or more commands via the PCIe interface upon executing the ROM code, the bootstrap code, and/or the bootloader code.

One or more devices or components shown in FIG. 2 may be configured to perform operations described herein, such as one or more operations and/or methods described in connection with FIGS. 1, 3, and 4. For example, the CPU 205 or the controller 130 may be configured to perform one or more operations and/or methods described herein.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) shown in FIG. 2 may perform one or more operations described as being performed by another set of components shown in FIG. 2.

Figure 3:
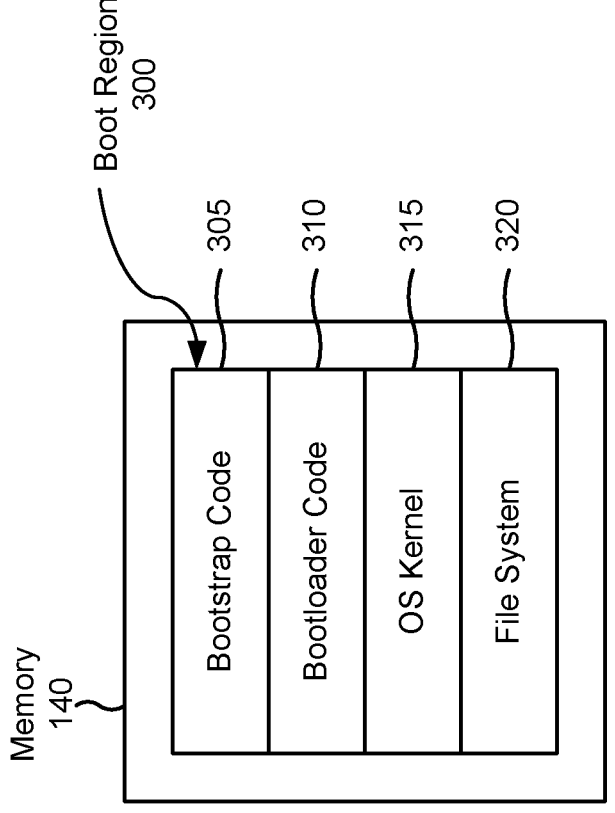
FIG. 3 is a diagram of example memory according to one or more implementations.

FIG. 3 is a diagram of example memory 140 according to one or more implementations. The memory 140 may include a boot region 300 that is configured in non-volatile memory of the memory 140. The boot region 300 may be a separate memory region within memory 140 (e.g., separate from a main PCIe memory area of the memory 140) or may be part of the main PCIe memory area of the memory 140. The boot region 300 may include a plurality of adjacent PCIe NAND address spaces, including a first PCIe NAND address space 305 for storing the bootstrap code, a second PCIe NAND address space 310 for storing the bootloader code, and a third PCIe NAND address space 315 for storing the OS kernel. The boot region 300 may also include an address space 320 for a filesystem. The filesystem may serve as a directory that the controller 130 may use to control how data is stored in and retrieved from the plurality of adjacent PCIe NAND address spaces.

The controller 130 of the monolithic memory device 120 may be configured to sequentially read the bootstrap code, the bootloader code, and the OS kernel from the boot region 300 in order to sequentially transmit the bootstrap code, the bootloader code, and the OS kernel to the host device 110 in response to receiving one or more commands directly from the host device (e.g., from the CPU 205) via the PCIe interface.

For fast boot operation, the monolithic memory device 120 may support host configurable booting parameters (e.g., interface speed, number of lanes, and default boot region) for a minimal and simplified host configuration and management during system start-up of the host system 110. In addition, for fast boot operation, the bootstrap code, the bootloader code, and the OS kernel may be stored in adjacent PCIe NAND address spaces in the default boot region. The default boot region may be a region of non-volatile memory that is the first to be streamed out of the memory 140 during a boot operation of the embedded system (e.g., embedded system 100 or 200) with a simplified command sequence. In addition, NAND ONFI commands may be remapped over the host interface 150. As a result, the boot sequence may enable the host device 110 to perform a direct boot from the monolithic memory device 120 over the PCIe bus with a reduced boot time, which may further be reduced based on the pre-loaded configuration determined by an execution of the ROM code, without an enumeration process in the early phase of system boot.

In low-capacity SSD systems used for certain applications, a separate controller (e.g., SSD controller) between the host device 110 and the monolithic memory device 120 is often too expensive to implement. In other words, for NAND/SSD storage solutions that have lower capacities (e.g., 64 GB, 128 GB, and 256 GB), the SSD controller is too expensive compared to amount of data stored in the monolithic memory device 120 (e.g., the NAND memory device). The direct PCIe interface between the host device 110 and the monolithic memory device 120 eliminates the separate SSD controller, which helps to align the cost of the embedded system with the relatively small amount of data stored in the monolithic memory device 120. The configuration of using the direct PCIe interface between the host device 110 and the monolithic memory device 120 calls for a modified concept for the PCIe boot sequence that may bring some booting time reduction by enabling a direct boot from the monolithic memory device 120 with the pre-loaded configuration and without the enumeration process in the early phase of system boot.

As indicated above, FIG. 3 is provided as an example. Other examples may differ from what is described with regard to FIG. 3.

FIG. 4 is a flowchart of an example method 400 associated with a monolithic non-volatile memory device using a PCIe interface for an embedded system. In some implementations, an embedded system (e.g., the embedded system 100 or 200) may perform or may be configured to perform the method 400. Additionally, or alternatively, one or more components of the embedded system (e.g., host device 110 and/or monolithic memory device 120) may perform or may be configured to perform the method 400. Thus, means for performing the method 400 may include the embedded system and/or one or more components of the embedded system. Additionally, or alternatively, a non-transitory computer-readable medium may store one or more instructions that, when executed by the embedded system, cause the embedded system to perform the method 400.

As shown in FIG. 4, the method 400 may include executing a ROM code at startup or at reboot of the host device, wherein executing the ROM code comprises retrieving a bootstrap code directly from a monolithic NVM device via a PCIe interface, such as a PCIe bus (block 410). As further shown in FIG. 4, the method 400 may include executing the bootstrap code, wherein executing the bootstrap code comprises retrieving a bootloader code directly from the monolithic NVM device via the PCIe interface (block 420). As further shown in FIG. 4, the method 400 may include executing the bootloader code, wherein executing the bootloader code comprises retrieving an OS kernel directly from the monolithic NVM device via the PCIe interface (block 430). As further shown in FIG. 4, the method 400 may include executing the OS kernel to complete the boot sequence and to initialize an operating system corresponding to the OS kernel (block 440).

The method 400 may include additional aspects, such as any single aspect or any combination of aspects described below and/or described in connection with one or more other methods or operations described elsewhere herein.

In a first aspect, the bootstrap code, the bootloader code, and the OS kernel are stored in adjacent PCIe NAND address spaces of a boot region of the monolithic NVM device.

In a second aspect, alone or in combination with the first aspect, executing the ROM code comprises detecting one or more hardware parameters, including an interface speed of the PCIe interface, a number of lanes of the PCIe interface, and memory locations at which the bootstrap code, the bootloader code, and the OS kernel are stored in the monolithic NVM device, and configuring the host device according to the one or more hardware parameters for retrieving the bootstrap code, the bootloader code, and the OS kernel from the monolithic NVM device.

Although FIG. 4 shows example blocks of a method 400, in some implementations, the method 400 may include additional blocks, fewer blocks, different blocks, or differently arranged blocks than those depicted in FIG. 4. Additionally, or alternatively, two or more of the blocks of the method 400 may be performed in parallel. The method 400 is an example of one method that may be performed by one or more devices described herein. These one or more devices may perform or may be configured to perform one or more other methods based on operations described herein.

In some implementations, an embedded system includes a host device comprising a first PCIe interface; an monolithic NVM device comprising a second PCIe interface; and a PCIe bus directly coupled to the first PCIe interface and the second PCIe interface for transmitting direct communications between the host device and the monolithic NVM device.

In some implementations, a monolithic NVM device includes a memory configured with a boot region, wherein the boot region is configured to store a bootstrap code in a first PCIe address space of the boot region, a bootloader code in a second PCIe address space of the boot region, and an OS kernel in a third PCIe address space of the boot region, wherein the first PCIe address space, the second PCIe address space, and the third PCIe address space are adjacent PCIe address spaces; a PCIe interface; and a controller configured to communicate directly with a host device via the PCIe interface, wherein the controller is configured to sequentially transmit the bootstrap code, followed by the bootloader code, and further followed by the OS kernel to the host device during a boot sequence of the host device.

In some implementations, a method of performing a boot sequence of a host device includes executing, by the host device, a ROM code at startup or at reboot of the host device, wherein executing the ROM code comprises retrieving a bootstrap code directly from a monolithic NVM device via a PCIe interface; executing, by the host device, the bootstrap code, wherein executing the bootstrap code comprises retrieving a bootloader code directly from the monolithic NVM device via the PCIe interface; executing, by the host device, the bootloader code, wherein executing the bootloader code comprises retrieving an OS kernel directly from the monolithic NVM device via the PCIe interface; and executing, by the host device, the OS kernel to complete the boot sequence and to initialize an operating system corresponding to the OS kernel.

The foregoing disclosure provides illustration and description but is not intended to be exhaustive or to limit the implementations to the precise forms disclosed. Modifications and variations may be made in light of the above disclosure or may be acquired from practice of the implementations described herein.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. An embedded system, comprising:
a host device comprising a first peripheral component interconnect express (PCIe) interface;
a monolithic non-volatile memory (NVM) device comprising a second PCIe interface; and
a PCIe bus directly coupled to the first PCIe interface and the second PCIe interface for transmitting direct communications between the host device and the monolithic NVM device,
wherein the host device is configured to sequentially retrieve a bootstrap code, a bootloader code, and an operating system (OS) kernel directly from the monolithic NVM device via the PCIe bus to execute a boot sequence in order to initialize an operating system of the host device.

2. The embedded system of claim 1, wherein the host device is a system-on-chip (SoC) comprising at least one central processing unit (CPU).

3. The embedded system of claim 1, wherein the monolithic NVM device is a NAND memory chip comprising the second PCIe interface.

4. The embedded system of claim 1, wherein the monolithic NVM device is a monolithic integrated circuit comprising the second PCIe interface.

5. The embedded system of claim 1, wherein the monolithic NVM device comprises only one NAND die that comprises the second PCIe interface.

6. The embedded system of claim 1, wherein the host device is configured to transmit NAND physical interface commands directly to the monolithic NVM device via the PCIe bus.

7. The embedded system of claim 1, wherein the PCIe bus comprises only one bidirectional channel.

8. The embedded system of claim 1, wherein the monolithic NVM device comprises a boot region configured to store the bootstrap code, the bootloader code, and the OS kernel.

9. The embedded system of claim 8, wherein the monolithic NVM device is configured to transmit, during the boot sequence of the embedded system, the bootstrap code directly to the host device via the PCIe bus, and
wherein the host device is configured to store, during the boot sequence of the embedded system, the bootstrap code in a static random-access memory (SRAM) of the host device and execute, during the boot sequence of the embedded system, the bootstrap code stored in the SRAM.

10. The embedded system of claim 9, wherein the host device comprises a read-only memory (ROM) that stores a ROM code, wherein, at startup or reboot of the host device, the host device is configured to execute the ROM code, which causes the host device to send a read command to the monolithic NVM device to retrieve the bootstrap code from the monolithic NVM device.

11. The embedded system of claim 10, wherein the host device is configured to detect, during an execution of the ROM code, one or more hardware parameters, including an interface speed of the PCIe bus, a number of lanes of the PCIe bus, and a memory location of the boot region in the monolithic NVM device, and
wherein the ROM code is configured to configure the host device according to the one or more hardware parameters for retrieving the bootstrap code, the bootloader code, and the OS kernel from the monolithic NVM device.

12. The embedded system of claim 9, wherein the host device is configured to copy, during an execution of the bootstrap code, the bootloader code from the monolithic NVM device to a dynamic random-access memory (DRAM) of the host device,
wherein, during the execution of the bootstrap code, the host device is configured to transmit a first command directly to the monolithic NVM device via the PCIe bus,
wherein the monolithic NVM device is configured to transmit, in response to the first command, the bootloader code directly to the host device via the PCIe bus, and
wherein the host device is configured to execute the bootloader code stored in the DRAM.

13. The embedded system of claim 12, wherein the host device is configured to copy, during an execution of the bootloader code, the OS kernel from the monolithic NVM device to the DRAM of the host device,
wherein the host device is configured to transmit, during the execution of the bootloader code, a second command directly to the monolithic NVM device via the PCIe bus,
wherein the monolithic NVM device is configured to transmit, in response to the second command, the OS kernel directly to the host device via the PCIe bus, and
wherein the host device is configured to execute the OS kernel stored in the DRAM.

14. The embedded system of claim 8, wherein the bootstrap code, the bootloader code, and the OS kernel are stored in adjacent PCIe NAND address spaces of the boot region of the monolithic NVM device.

15. A monolithic non-volatile memory (NVM) device, comprising:
a memory configured with a boot region, wherein the boot region is configured to store a bootstrap code in a first peripheral component interconnect express (PCIe) address space of the boot region, a bootloader code in a second PCIe address space of the boot region, and an operating system (OS) kernel in a third PCIe address space of the boot region, wherein the first PCIe address space, the second PCIe address space, and the third PCIe address space are adjacent PCIe address spaces;
a PCIe interface; and
a controller configured to communicate directly with a host device via the PCIe interface, wherein the controller is configured to sequentially transmit the bootstrap code, followed by the bootloader code, and further followed by the OS kernel to the host device during a boot sequence of the host device.

16. The monolithic NVM device of claim 15, wherein the controller is configured to sequentially transmit the bootstrap code, the bootloader code, and the OS kernel to the host device in response to receiving one or more commands via the PCIe interface.

17. The monolithic NVM device of claim 15, wherein the monolithic NVM device is a NAND memory chip comprising the PCIe interface.

18. A method of performing a boot sequence of a host device, the method comprising:

executing, by the host device, a read-only memory (ROM) code at startup or at reboot of the host device, wherein executing the ROM code comprises retrieving a bootstrap code directly from a monolithic non-volatile memory (NVM) device via a peripheral component interconnect express (PCIe) interface;

executing, by the host device, the bootstrap code, wherein executing the bootstrap code comprises retrieving a bootloader code directly from the monolithic NVM device via the PCIe interface;

executing, by the host device, the bootloader code, wherein executing the bootloader code comprises retrieving an operating system (OS) kernel directly from the monolithic NVM device via the PCIe interface; and executing, by the host device, the OS kernel to complete the boot sequence and to initialize an operating system corresponding to the OS kernel.

19. The method of claim 18, wherein the bootstrap code, the bootloader code, and the OS kernel are stored in adjacent PCIe NAND address spaces of a boot region of the monolithic NVM device.

20. The method of claim 18, wherein executing the ROM code comprises:

detecting one or more hardware parameters, including an interface speed of the PCIe interface, a number of lanes of the PCIe interface, and memory locations at which the bootstrap code, the bootloader code, and the OS kernel are stored in the monolithic NVM device; and configuring the host device according to the one or more hardware parameters for retrieving the bootstrap code, the bootloader code, and the OS kernel from the monolithic NVM device.

\* \* \* \* \*